United States Patent [19]
Ellis

[11] Patent Number: 5,760,700
[45] Date of Patent: Jun. 2, 1998

[54] SECURITY SYSTEM WITH SUCCESSION OF CODES

[75] Inventor: Antony Mark Ellis, Carlshalton, United Kingdom

[73] Assignee: Electronics Research and Design UK Ltd., Watford, United Kingdom

[21] Appl. No.: 711,672

[22] Filed: Sep. 4, 1996

Related U.S. Application Data

[63] Continuation of Ser. No. 318,819, filed as PCT/GB93/00851 Apr. 23, 1993 published as WO93/22164 Nov. 11, 1993, abandoned.

[30] Foreign Application Priority Data

May 2, 1992 [GB] United Kingdom ............... 9209678

[51] Int. Cl.[6] ................................................. H04Q 1/00
[52] U.S. Cl. .............................. 340/825.3; 380/23
[58] Field of Search ................. 340/825.44, 825.52, 340/825.31, 825.34, 825.3; 379/95; 380/20, 23

[56] References Cited

U.S. PATENT DOCUMENTS

| | | | |
|---|---|---|---|
| 4,596,985 | 6/1986 | Bongard | 340/825.31 |
| 4,630,201 | 12/1986 | White | 340/825.34 |
| 4,672,533 | 6/1987 | Noble | 340/825.34 |
| 4,736,419 | 4/1988 | Roe. | |
| 4,761,808 | 8/1988 | Howard | 379/95 |
| 4,791,280 | 12/1988 | O'Connell | 340/825.31 |
| 4,847,614 | 7/1989 | Keller | 340/825.56 |
| 5,159,329 | 10/1992 | Lindmayer et al. | |
| 5,239,294 | 8/1993 | Flanders | 340/825.34 |

FOREIGN PATENT DOCUMENTS

| | | |
|---|---|---|
| 0372285 | 6/1990 | European Pat. Off. . |
| 1585859 | 3/1981 | United Kingdom . |
| 9015211 | 12/1990 | WIPO . |

*Primary Examiner*—Brian Zimmerman
*Attorney, Agent, or Firm*—Christie, Parker & Hale, LLP

[57] ABSTRACT

The security system involved in the arming and disarming of a car alarm, includes a transmitter and a receiver. Both transmitter and receiver includes oscillators incorporating a highly accurate and stable quartz time base. Each oscillator drives a respective encoder to develop a pseudo random succession of codes. Reset switches are provided for both transmitter and receiver to synchronize the two oscillators and therefore to synchronize the succession of codes. The receiver includes a decoder for decoding the received signals and a comparator for comparing the decoded signal with the signal generated by the encoder. When equality is detected an arm/disarm circuit is triggered. Because the codes of the transmitter and receiver are continually changing, it makes it very difficult for a thief to produce a coded signal which will trigger the arm/disarm circuit.

6 Claims, 11 Drawing Sheets

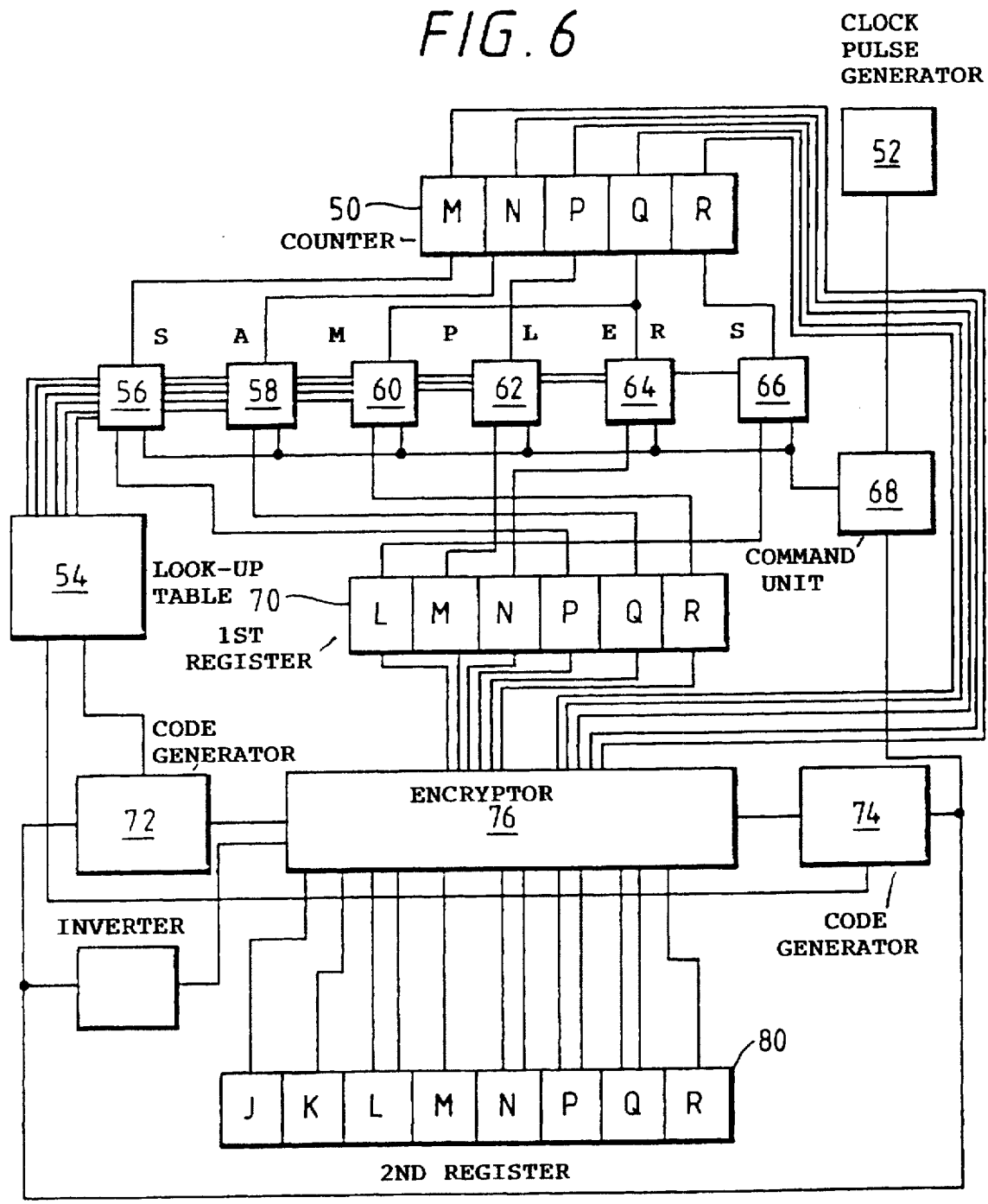

FIG. 7
MAIN LOOK UP TABLE

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 9 | 7 | B | 0 | 4 | A | 1 | 3 | C | 8 | 5 | F | D | 6 | 2 | E |
| 1 | A | 3 | 8 | 1 | B | 5 | 2 | 9 | 4 | D | 0 | E | 7 | C | 6 | F |
| 2 | B | 2 | 4 | A | 0 | 9 | C | 1 | 5 | 7 | D | 3 | F | E | 8 | 6 |
| 3 | 1 | 6 | 2 | 4 | E | 6 | A | F | 3 | 5 | 9 | B | 7 | 8 | D | 0 |
| 4 | 4 | 9 | 7 | 5 | A | 0 | D | 3 | 1 | C | E | 6 | B | 2 | E | 8 |
| 5 | D | 1 | 9 | 4 | 7 | 2 | F | A | E | 3 | 5 | 8 | 6 | 0 | C | B |
| 6 | E | A | 5 | 3 | 9 | 8 | B | 7 | 1 | 6 | 2 | 4 | C | F | 0 | D |
| 7 | 2 | F | 6 | 9 | C | 4 | E | 8 | 0 | B | 5 | D | 1 | 7 | 3 | A |
| 8 | 0 | B | A | 2 | 5 | C | 3 | 4 | 6 | 9 | E | 1 | 8 | D | 7 | F |
| 9 | 3 | 5 | F | 6 | D | 1 | 4 | B | 2 | A | 7 | 9 | 0 | E | 8 | C |
| A | 5 | D | 1 | 7 | 2 | F | 6 | 9 | A | 4 | B | C | 3 | 8 | E | 0 |
| B | 8 | 4 | A | E | 1 | D | 5 | 2 | F | B | 3 | 7 | 9 | 6 | C | 0 |
| C | B | 8 | 0 | C | 3 | 6 | 9 | 5 | 7 | 1 | 4 | 2 | A | E | F | D |
| D | F | 0 | D | 8 | 4 | 3 | B | 6 | C | F | 1 | 5 | 2 | A | 9 | 7 |
| E | 6 | 3 | 0 | D | F | 7 | 2 | C | 8 | E | 9 | A | 4 | 1 | B | 5 |
| F | 7 | 6 | 3 | A | 6 | 9 | 7 | E | 4 | 2 | 8 | F | C | B | 5 | 1 |
|   | 2 | 4 | B | 1 | C | 5 | 9 |   |   |   |   |   |   |   |   |   |

OVERFLOW     COLUMN →

ROW ↓

POINTER JUMP TABLE

| 3 | 4 | 5 | 6 | 3 | 4 | 5 | 6 | 7 | 3 | 4 | 5 | 3 | 4 | 5 | 6 |
|---|---|---|---|---|---|---|---|---|---|---|---|---|---|---|---|

FIG. 10

| TABLE II | |
|---|---|
| PS1 | INSTRUCTION |
| 0 | XOR : PS1 WITH 70P |
| 1 | XOR : PS1 WITH 70N |
| 2 | XOR : PS1 WITH 70M |
| 3 | XOR : PS1 WITH 70L |
| 4 | XOR : PS2 WITH 50R |
| 5 | XOR : PS2 WITH 50Q |
| 6 | XOR : PS2 WITH 50P |
| 7 | XOR : PS2 WITH 50N |
| 8 | OR : PS1 WITH 50R |
| 9 | OR : PS1 WITH 50Q |
| A | OR : PS1 WITH 50P |
| B | OR : PS2 WITH 70R |
| C | OR : PS2 WITH 70Q |
| D | OR : PS2 WITH 70M |
| E | RORC PS1 |
| F | RORC PS2 |

| TABLE III | |
|---|---|
| PS2 | INSTRUCTION |
| 0 | RORC P1 |
| 1 | RORC P2 |
| 2 | OR : P2 WITH 80Q |
| 3 | OR : P2 WITH 80P |
| 4 | OR : P1 WITH 80Q |
| 5 | OR : P1 WITH 80P |
| 6 | XOR : P1 WITH PS1 |
| 7 | XOR : P1 WITH 80Q |
| 8 | XOR : P1 WITH 80P |
| 9 | XOR : P1 WITH 80N |
| A | XOR : P1 WITH 80L |
| B | XOR : P2 WITH PS1 |
| C | XOR : P2 WITH 80Q |
| D | XOR : P2 WITH 80P |
| E | XOR : P2 WITH 80N |
| F | XOR : P2 WITH 80L |

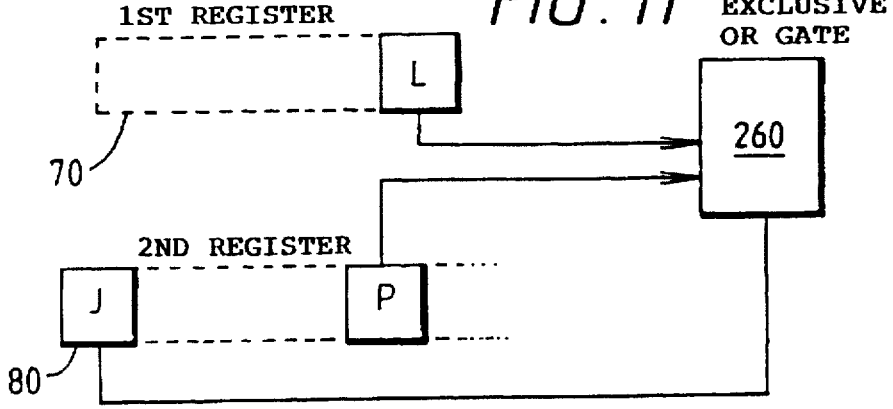

FIG. 11

SECURITY SYSTEM WITH SUCCESSION OF CODES

CROSS-REFERENCE TO RELATED APPLICATION

This is a continuation of application Ser. No. 08/318,819, filed as PCT/GB93/00851 Apr. 23, 1993, published as WO93/22164 Nov. 11, 1993, now abandoned.

The present invention relates to security systems in particular, but not exclusively, for use in motor vehicles.

Motor vehicles equipped with alarm systems, when armed, operate an audible alarm when a third party attempts unauthorised access to the vehicle.

Such systems are armed or disarmed by transmitting a coded radio, ultrasonic or infrared signal from a pocket sized transmitter to a receiver in the car. The receiver in the car checks or validates the code and provided the code corresponds to the correct code stored in the receiver, an appropriate arm/disarm circuit is activated.

With increasing levels of sophistication amongst car thieves, such systems have become increasingly vulnerable. In particular thieves have been known to provide a transmitter which sequentially transmits each of the many thousands (around 64,000) possible codes in turn. By leaving the transmitter in the vicinity of the targeted vehicle for a period of say two to-three hours, it is almost inevitable that the code associated with the targeted vehicle will eventually be transmitted whereupon the alarm system will be disarmed thereby enabling the thief to return and steal the vehicle using more traditional techniques.

Another technique employed by thieves is to monitor the area in the vicinity of the car for any transmissions by the driver to arm or disarm the car. Such transmissions are digitally stored and when the car is left unattended the stored signal is reproduced and transmitted to again disarm the car.

European Patent Specification No EP-A-0 265 728 discloses a security system having a transmitter and a receiver for receiving signals transmitted from the transmitter. The transmitter and receiver each have a control unit producing the same predetermined clock frequencies and encoders for producing, generally in synchronism, a sequence of different codes. The receiver has a comparator for comparing the locally generated codes with those received, and generating a trigger output signal when equality is detected. The receiver and transmitter each have means for effecting an initial synchronisation between the control units and encoders of the transmitter and the receiver.

Successive codes generated by the transmitter follow a predetermined pattern irrespective of any delay between the transmission of successive codes.

It is an object of the invention to provide an improved security system in which the successive codes generated will be different for different delays between successive transmissions.

According to the present invention there is provided a security system comprising a transmitter, a receiver for receiving signals transmitted from the transmitter, the receiver including a comparator for comparing the locally generated coded data with that received from the transmitter, and generating a trigger output signal when equality is detected, characterised in that the transmitter and receiver each have an oscillator, a counter driven by the oscillator and an encoder, the encoder when activated encrypting the instantaneous count of the counter to produce coded data according to a predetermined encryption compilation, the coded data of the transmitter and receiver being produced substantially in synchronism, said receiver and transmitter having means for effecting an initial or subsequent synchronisation between the counters.

According to the present invention there is further provided a security system for generating a pseudo random code comprising a clock pulse generator for generating pulses at regular intervals, a counter for counting the clock pulses generated, and an encryption device for encrypting the count of the counter, the counter being divided into a first plurality of locations each containing a predetermined number of nibbles, and the encryption device having a first register divided into a second plurality of locations and on the second register divided into a third plurality of locations with each location of said first and second registers having said predetermined number of nibbles, a look-up table for converting the contents of a said location from one value to another, means for sampling at least selected ones of the locations of the counter and converting the contents therein using the look-up table, according to a predetermined formula and inserting the converted values into selected locations in the first register, and means for combining the contents of selected locations in the counter and first register in accordance with a predetermined formula and inserting the results in pre-selected locations in the second register.

According to the present invention there is still further provided a security system comprising a master transmitter for transmitting an identity code and a pseudo random dynamic code, a receiver having main storage means for storing an identity code and a pseudo random dynamic code and having a comparator for comparing the identity code and pseudo random dynamic code with a received identity code and received pseudo random dynamic code to generate a command signal when equality is detected, and enabling means operable following the loss of the stored identity code resulting from de-energisation of the receiver for enabling the storage means to store the first identity code received upon subsequent energisation and thereafter blocking the storage of another identity code until the receiver is again re-energised.

A car security system embodying the invention will now be described by way of example with reference to the accompanying diagrammatic drawings in which;

FIG. 6 is a block diagram of the alternative security system;

FIG. 7 is a look-up table used by the alternative security system;

FIG. 10 are two instruction tables for the security system of FIG. 6.

FIG. 11 is a block diagram of an auxiliary encryption circuit for the security system of FIG. 6.

Figure 1:
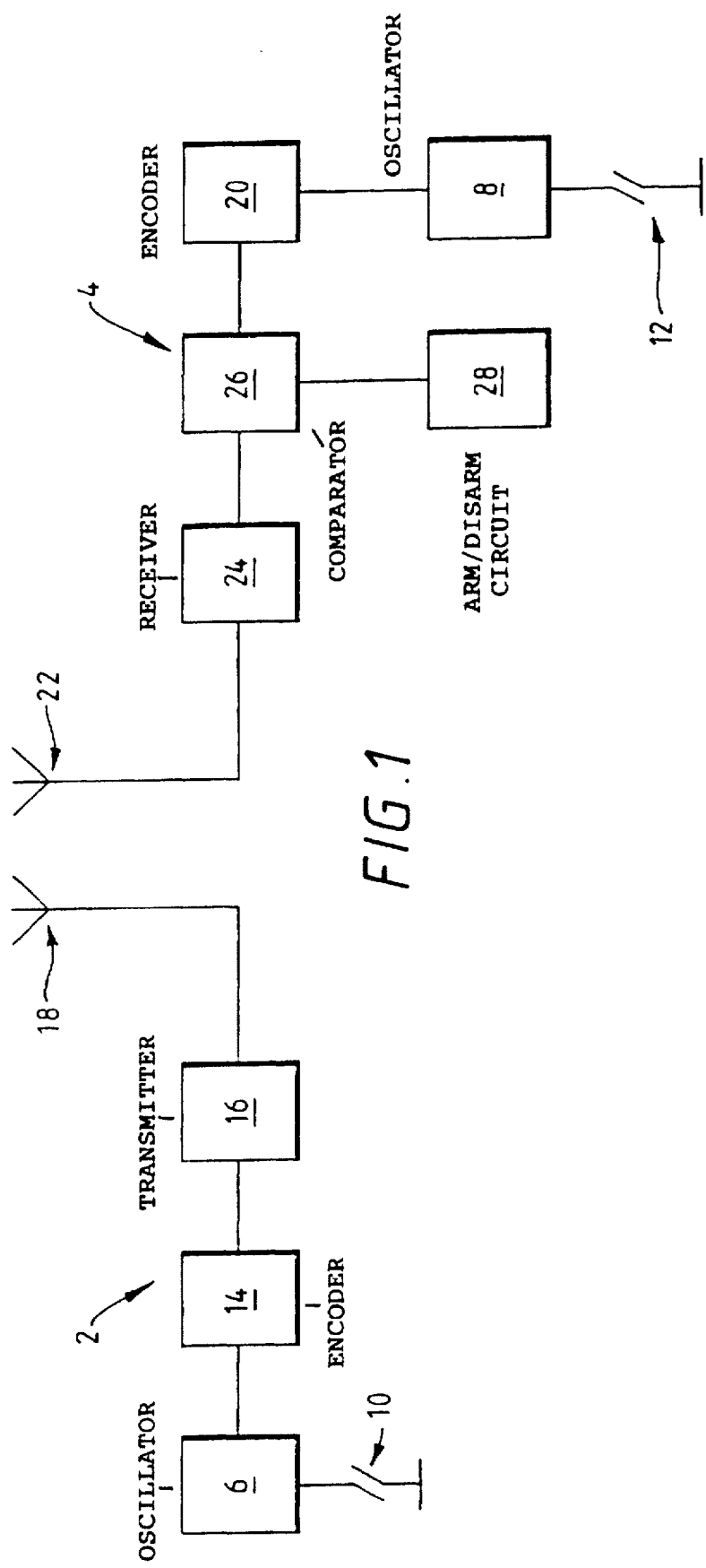
FIG. 1 is a block diagram of the security system.

As shown in FIG. 1 the system comprises a transmitter 2 and a receiver 4. Both the transmitter and receiver have identical quartz crystal time base oscillators 6 and 8 each with its own respective reset switch 10 and 12 so that the two oscillators can be synchronised by simultaneously operating the reset switches. The reset switches 10 and 12 are preferably electronic switches to enable the oscillators to be brought into close synchronisation. Reed relays, Hall-effect, or piezoelectric switches can be used.

The transmitter 2 has an encoder 14 which responds to the output of the oscillator 6 to generate a succession of codes in a pseudo random sequence. This succession of codes is fed to a radio transmitter circuit 16 for propagation from an antenna 18.

The receiver 12 has an encoder 20 which responds to the output of the oscillator 8 to generate the same succession of codes in the same pseudo random sequence as are generated by the encoder 14. An antenna 22 receives the signals generated by the antenna 18 and feeds them to a radio receiver circuit 24. A comparator 26 compares the outputs of the radio receiver circuit 24 and the encoder 20 and when equality is detected sends a trigger sequence to an arm/disarm circuit 28 for activating or deactivating the alarm system.

It will be appreciated that because the codes on which both the receiver and transmitter are operating are both continually changing albeit in synchronisation, it becomes very difficult for a thief to generate the correct code at the correct instant to achieve a deactivation of the alarm system.

Figure 2:
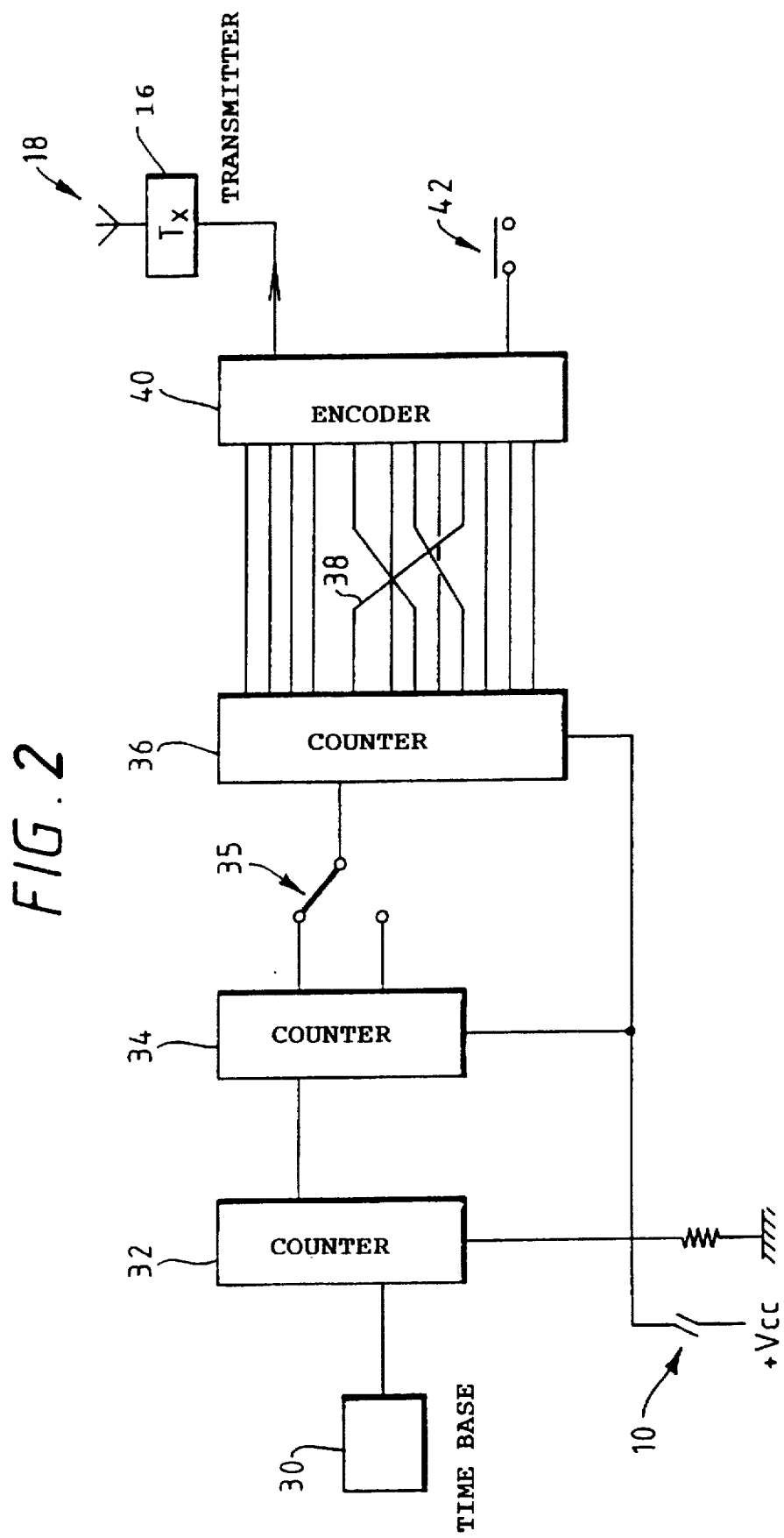
FIG. 2 is a block diagram showing the transmitter of the security system of FIG. 1 in more detail.

The transmitter 2 of FIG. 1 is shown in more detail in FIG. 2.

As shown a quartz time base 30 generates clock pulses which feed a fourteen stage ripple counter 32 to provide a one second time base at its output. The output of the counter 32 feeds a seven stage ripple counter 34 to produce a 30 second time base (optimally the time base may be one minute which is achieved with the aid of a changeover switch 35).

The output of the counter 35 feeds a twelve stage ripple counter 36. Each of the twelve stages of the counter 36 is connected to a different one of twelve address lines of an encoder 40. The connections 38 between the stages of the counter 36 and the address lines of the encoder are in a random sequence so that as the count of the counter 36 increases sequentially, the output of the encoder produces codes in a pseudo random sequence. A send switch 42 actives the encoder 40 to feed a succession of coded signals to the radio transmitter circuit 8.

The reset switch 10 is connected to the reset inputs of the three counters 32, 34 and 36 and when operated, resets the counters to zero.

Figure 3:
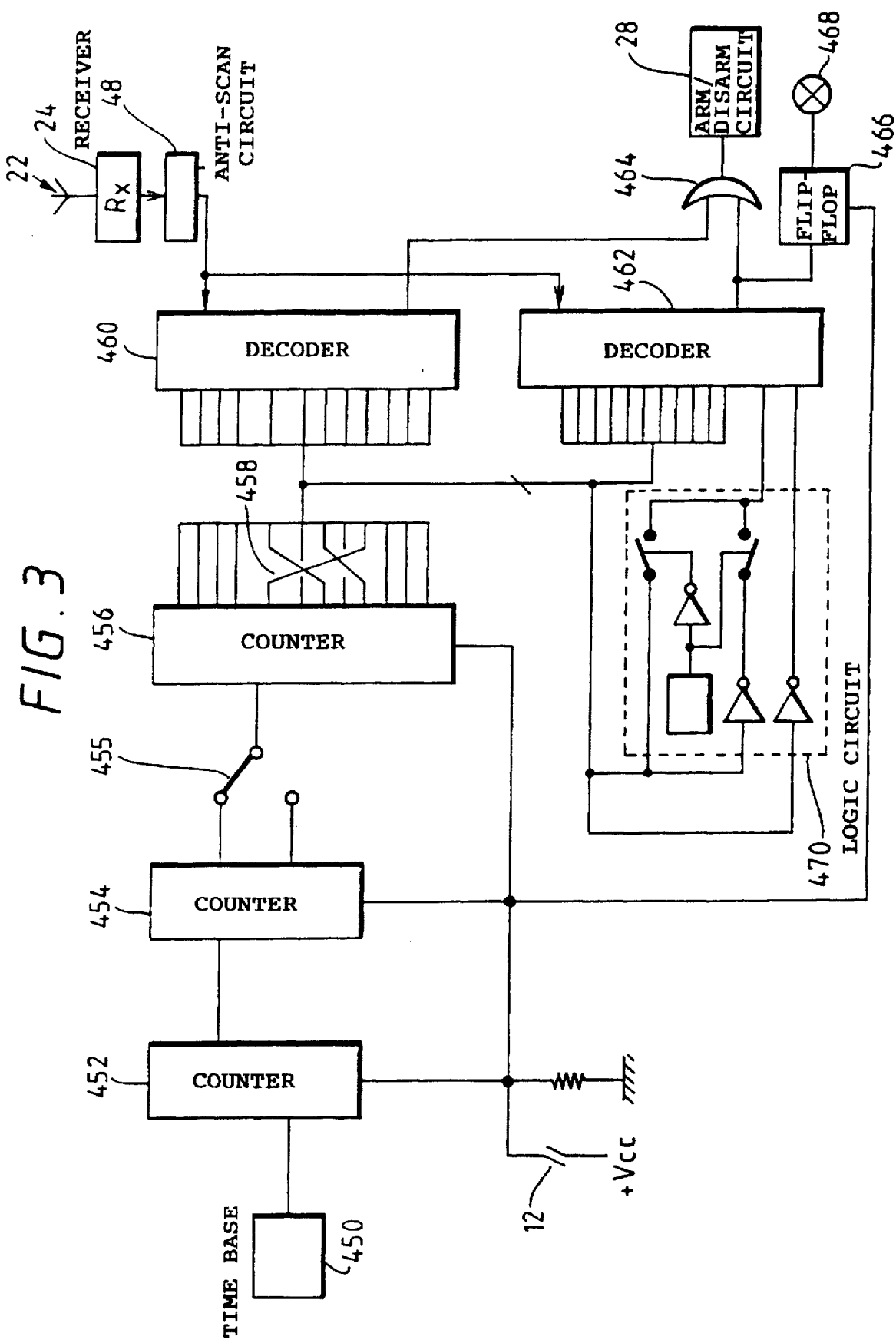
FIG. 3 is a block diagram showing the receiver of the security system of FIG. 1 in more detail.

The receiver 4 is shown in more detail in FIG. 3. The oscillator 8 consists of a quartz time base 450, a fourteen stage, a seven stage and a twelve stage counter 452, 454 and 456 respectively all similar to the quartz time base 30 and the counters 32, 34 and 36 shown in the transmitter of FIG. 2. A change-over switch 455 is also provided to change the time base of the counter 454 from thirty seconds to one minute and the reset switch 12 is connected to the reset inputs of the three counters 452, 454 and 456.

The output of the receiver 24 is fed through an anti-scan circuit 48 (to be described in more detail hereinafter) to two twelve stage decoders 460 and 462 in parallel. The address inputs of the decoder 460 are connected by connectors 458 to the twelve stages of the counter 456 in the same configuration as the connectors 38 connect the counter 36 to the encoder 40.

When the received code is identical to the locally generated code, the decoder 460 will generate an output which is fed through an OR gate 464 to the arm/disarm circuit 28.

However, it will be appreciated that the two oscillators 450 and 30 may drift slightly apart over a long period of time and so the two codes compared by the decoder 460 may differ from one another. If the configuration of the conductors 38 and 458 is such that the least significant digits of successive codes are consecutive then it is possible to feed to the second decoder 462 with a code which is alternately the previous and the next code to that which is fed to the decoder 460.

Accordingly if synchronisation between the transmitter and receiver drifts by the amount of one successive code, then the decoder 462 will still be able to detect the transmitted code and generate an output which is fed via the second input of the OR gate 464 to the arm/disarm circuit 28.

The output of the second decoder 462 is fed to a flip flop 466 to switch the flip flop 466 to its second state when triggered. The flip flop 466 when in its second state energises a resynch indicator 468 to indicate that the transmitter and receiver have started to drift out of phase.

The reset input of the flip flop 466 is connected to the switch 12 to be reset when the switch 12 is operated.

The logic circuit 470 enables the next/previous code to be generated. The logic circuit 470 is connected by the connectors 458 associated with the two least significant stages of the counter 456 to the two least significant address inputs of the decoder 462. The logic circuit inverts the least significant digit signal and switches this second least significant signal between an inverted and a non inverted state. When the indicator 468 indicates an out of phase condition the reset switches 12 and 14 should be synchronously closed at the next convenient opportunity to prevent the drift becoming excessive. All the counters and the flip flop will then resume the same in-phase state.

This switching may be achieved by physically bringing the transmitter and receiver together to cause both switches to close e.g. with the use of a magnet and reed switches.

The system is still susceptible to unauthorised entry if, for example, a thief causes the same code to be transmitted fairly continuously over a long period of time. At some instant in time the selected code will be the same as the instantaneous code fed to the decoders. The anti-scan circuit reduces the risk of a thief being successful with such a technique.

Figure 4:
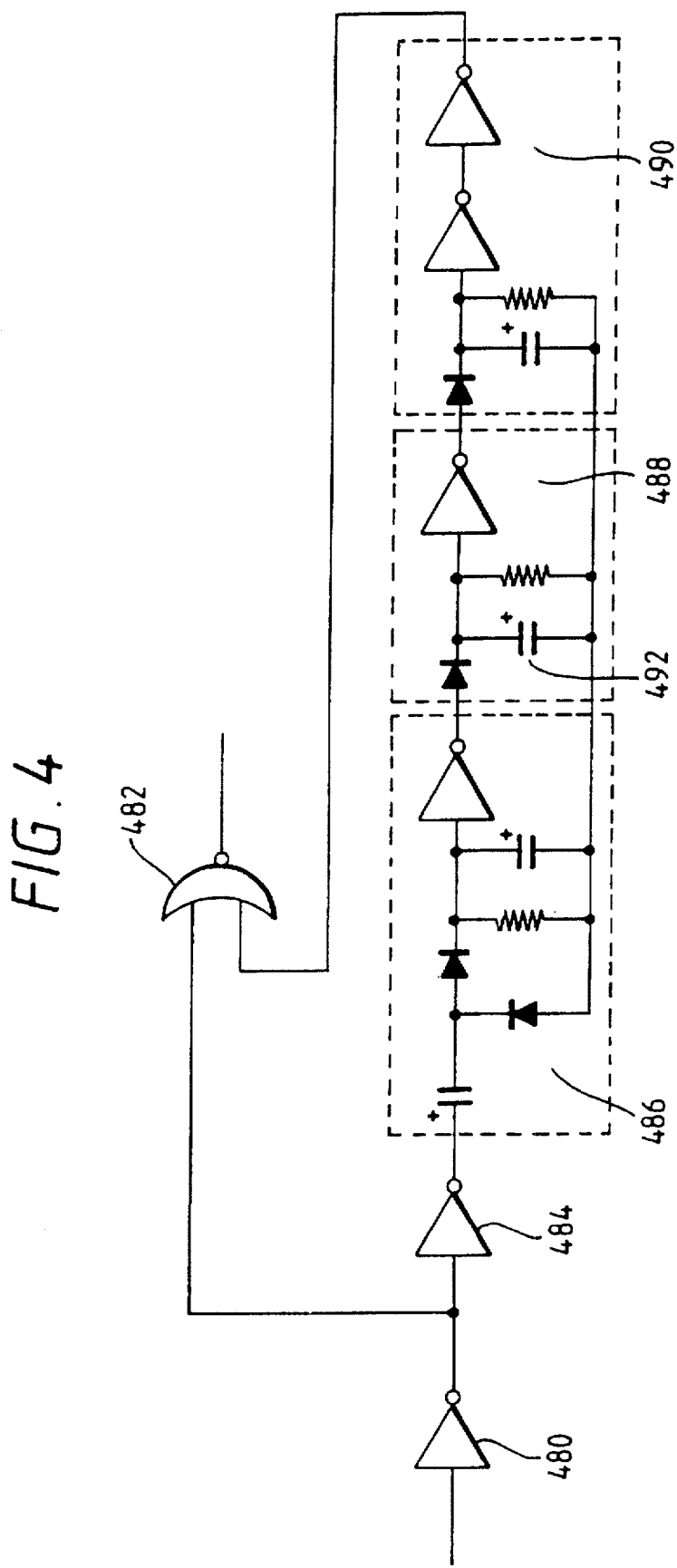
FIG. 4 is a circuit diagram of an anti-scan circuit for use with the receiver of FIG. 3.

The anti-scan circuit which is shown in more detail in FIG. 4 in effect acts to inhibit the decoders 460 and 462 from receiving the received signal after a predetermined transmission duration. Thus once a transmitted signal is received, there is only a small window of time for the correct code to be detected and the circuit 28 to be deactivated. After this time window the detection of further codes is inhibited until a period in which no signals are received by the radio receiver elapses.

As shown in FIG. 4 the output of the radio transmitter 8 is fed to a buffer/inverter 480. The output from the buffer/inverter 480 is fed simultaneously to one input of a NOR gate 482 and to the input of a second invertor 484. The output of the second invertor is fed to the input of a pulse DC detector 486 which converts the pulses received to a DC signal. The output of the detector 486 is fed to a pre-inhibit timer 488. The timer 488 has a capacitor 492 which is progressively discharged in response to the output of the detector 486. After a protracted negative output from the detector 486, representing a prolonged period of pulse transmission, the capacitor 492 will be discharged below a threshold level and the timer 488 will generate an output which is fed to a second timer 490. Upon receipt of an output from the first timer 488 the second timer 490 produces an output which lasts a period of twenty seconds. This latter output is fed to the second input of the NOR gate 482 which then acts to inhibit the passage of further signals from the buffer/inverter 480 to the decoders 460 and 462.

While the alarm system described is primarily intended for use with the protection of motor vehicles, it will be appreciated that it can be used for other security arrangements e.g. for allowing access of personnel to selected areas as well as enabling and disabling the alarm system.

It will also be appreciated that a signal transmitted between transmitter and receiver is not limited to radio and infrared transmissions but can be transmitted in any other form e.g. ultrasonic or by visible light or a combination of forms for even greater security.

An alternative security system in which the dynamic codes are heavily encrypted will now be described with reference to FIGS. 5 to 13.

Figure 5:
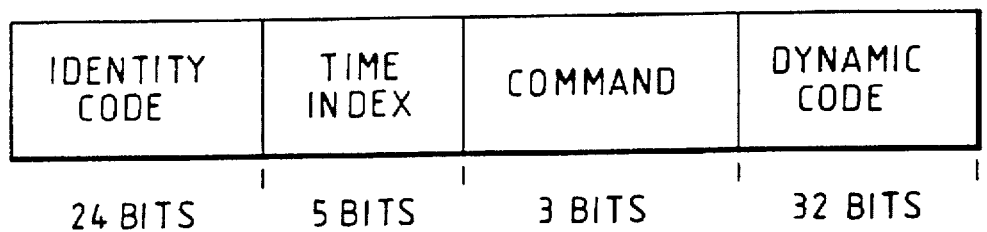
FIG. 5 is a block diagram of a code used in an alternative security system.
Figure 8:
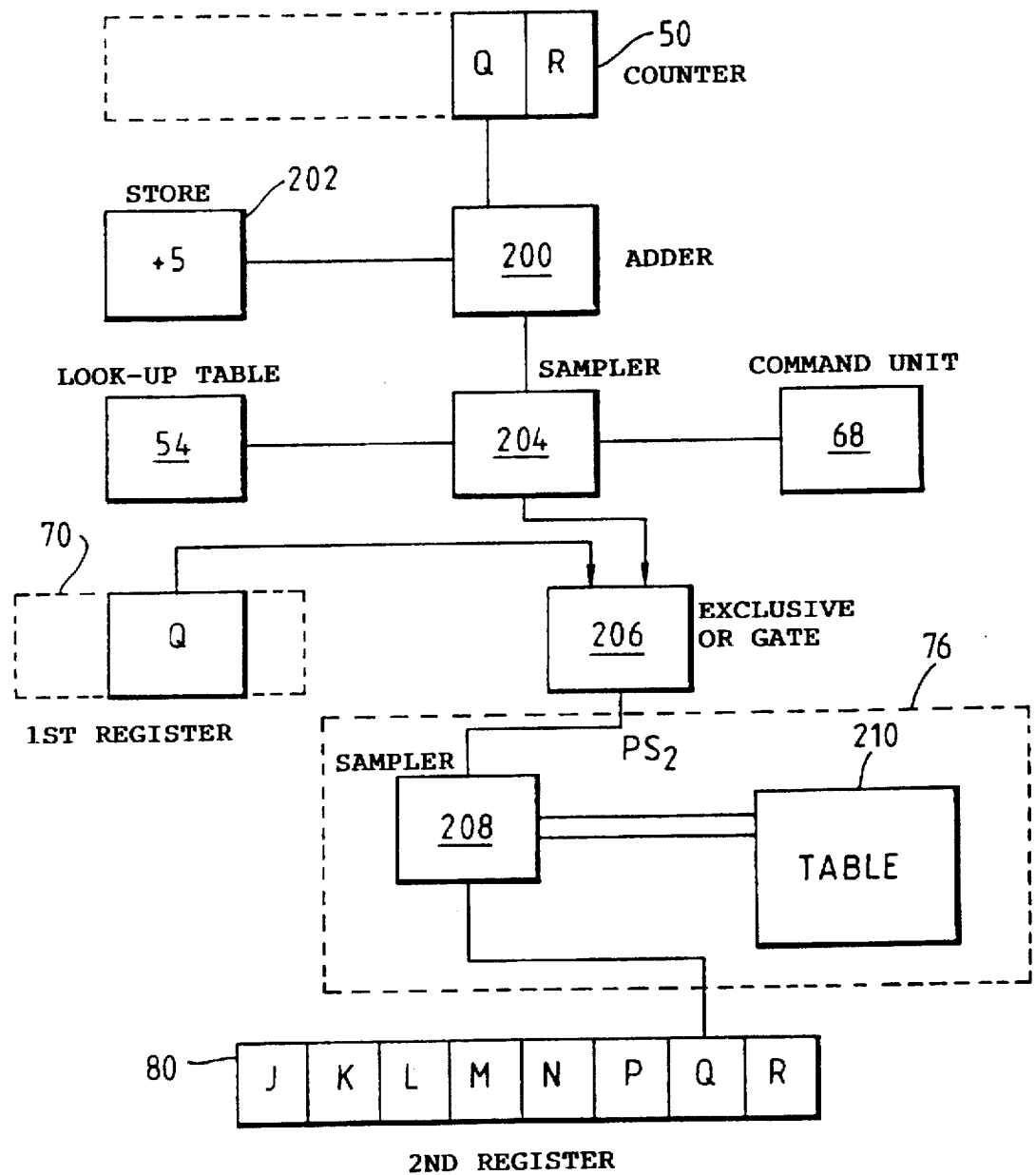
FIG. 8 is a block diagram of one code generator of the security system of FIG. 6.
Figure 9:
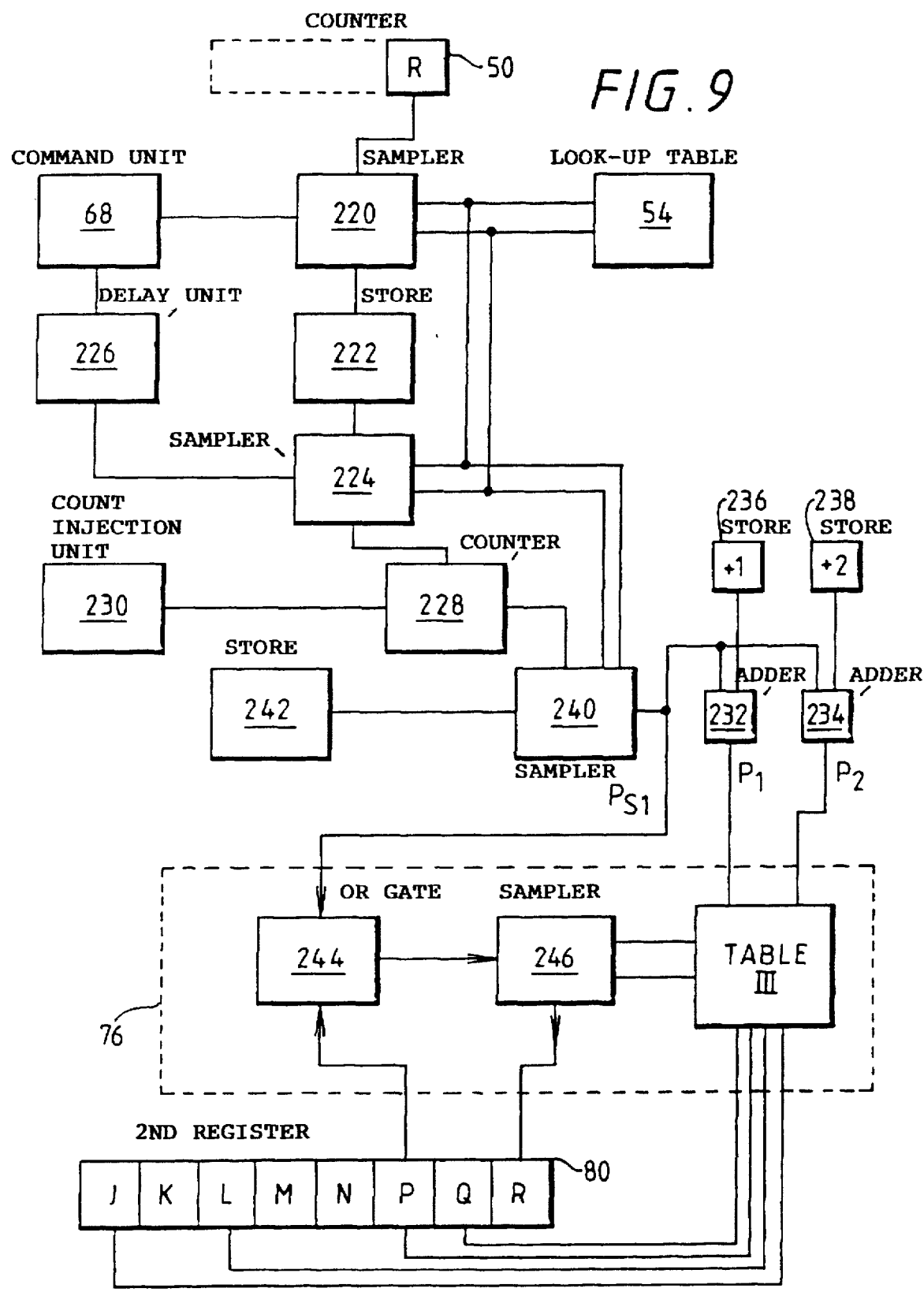
FIG. 9 is a block diagram of another code generator of the security system of FIG. 6.
Figure 12:
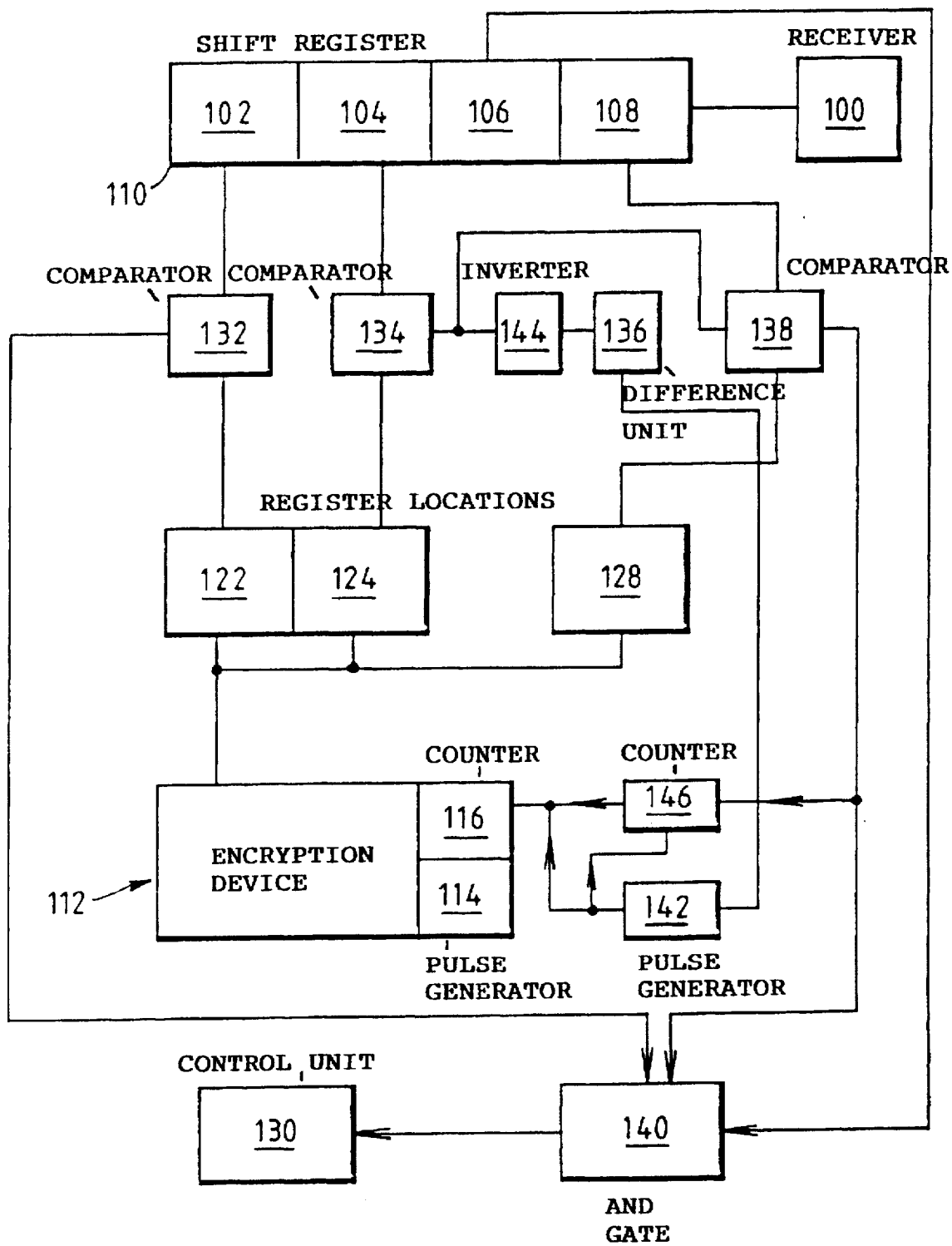
FIG. 12 is a block diagram of the receiver of the security system of FIG. 6.
Figure 13:
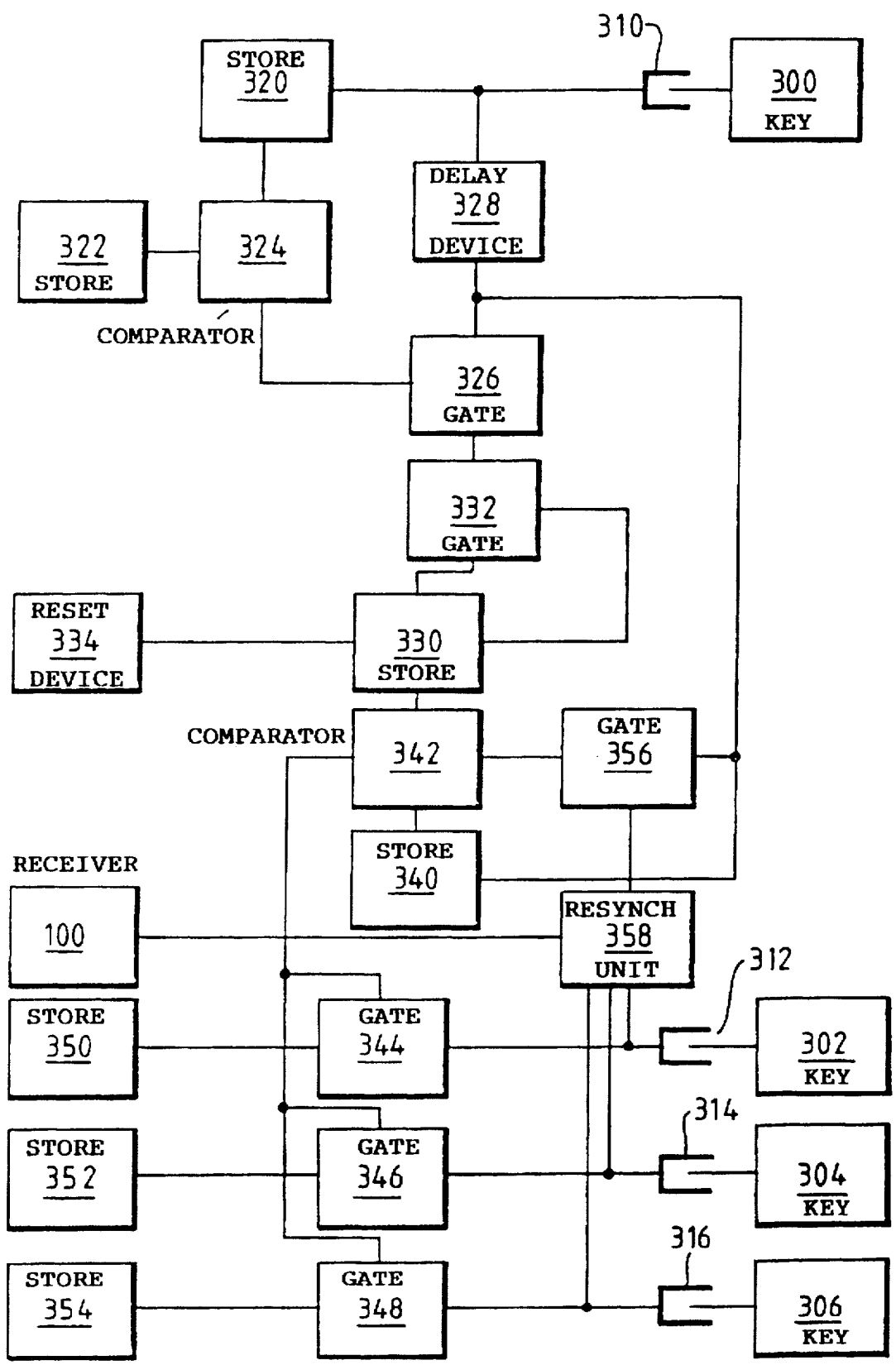
FIG. 13 is a block diagram of a reprogramming circuit for reprogramming the receiver of the system of FIG. 6 with a new identity code.

FIG. 5 shows a typical sixty four bit word transmitted by the transmitter and received by the receiver.

As shown the first twenty four bits of the word represent the identity code which is unique to the transmitter and its associated receiver. The next five bits are dedicated to a time index and represent the five least significant bits of a counter, which in the transmitter counts the successive pulses generated by a clock generator. The next three bits in the succession represent type of command signal. In a car for example, one command signal might represent the command to disable the alarm, another might be to effect automatic unlocking of the doors, and a third might be to effect both. The final thirty two bits of the word represent a dynamic code. This dynamic code will be different for different counts registered by the transmitter counter. An encryption device when activated is used to encrypt the count of the counter. The purpose of the encryption device is to cause the dynamic code to follow a pseudo random pattern which only repeats itself after an excessively long period—say once every eleven years when the pulse generation rate of the clock pulse generator operates at two pulses per minute.

In this way it becomes virtually impossible for a thief to decode the encryption device in a short enough period for it to be any use to him.

The transmitter and the receiver have matching clock pulse generators, counters and encryption devices, and once synchronised should both produce the same thirty two bit dynamic code at any instant in time.

The receiver has a comparator which compares the locally generated code with that transmitted by the transmitter and if equality is detected then appropriate action can be taken.

Recognizing that there may be some time drift between matching clock generators, the receiver is able to determine the extent of the drift (assuming that it is relatively small) by comparing the time index component of the received and locally generated codes and bringing the receiver counter back into synchronisation with the transmitter counter. This will be described in more detail hereinafter.

The encryption device will now be described in more detail. In order to produce a particularly difficult encryption to decode, the encryption device ensures that the most significant digits of the dynamic code change at least as frequently as the least significant digits.

FIG. 6 shows the main counter 50 supplied by clock pulses at thirty second intervals by a clock pulse generator 52.

The counter 50 is a twenty bit counter in which the bits are grouped into groups of five nibbles M to R with each nibble consisting of four bits. The bits of each nibble can be read in hexadecimal form, i.e. the count of each nibble will vary between 0 and 15, with the numbers 10 to 15 being hereinafter represented in alphabetical form A to F. Thus A=10 and B=11 etc.

On a command to encrypt the count of the counter 50, selected nibbles of the main counter 50 are sampled, and the value of each nibble is converted to a new value, which new value is then fed into a selected location of a first register 70 which is capable of storing six nibbles in locations L to R. The conversion to a new value is determined by reference to a look-up table (see FIG. 7) 54 by means of which the sampled value is converted to a new value as will be described hereinafter.

Six samplers 56 to 66 are provided to sample the contents of the five nibbles M, N, P, Q and R. Thus sampler 66 will, upon a command signal from an encrypt command unit 68, sample the contents of nibble location R in the main counter 50 and obtain from row 1 in the look-up table 54 (see FIG. 3) a new nibble value which will then be inserted in a location for nibble location L in the register 70. The new value is determined by taking the value of the nibble R in counter 50 choosing the column of that value, and then taking the value in that column in row 1. Thus if the value in nibble location R is a binary 0001 i.e. 1 in hexadecimal form, the value in column 1 row 1 is 3 which is then entered into nibble location L in the first register 70.

Samplers 60 and 64 both sample the value in nibble location Q but obtain different look-up values from rows 2 and 4 of the look-up table 54. These values are respectively inserted in nibble locations N and R in the register 70. Three further samplers 62, 58 and 56 sample respective nibble locations P, N and M and from rows 3, 5 and 6 of the look-up table insert new values into respective nibble locations M, Q and P in the register 70.

The look-up table is shown more clearly in FIG. 7. As can be seen there are sixteen rows labelled 0 to F and sixteen columns labelled 0 to F. There is also an overflow row extending to seven columns.

Also shown is a pointer jump table of one row having sixteen columns 0 to F (see look-up table for column designations). This will be explained in more detail hereinafter.

The numbers in each row include all the digits from 0 to F and no two rows have the digits 0 to F in the same order. The samplers 66 to 56 are associated with respective rows 1 to 6. Thus assuming that nibble R in main counter is one, the sampler 66 will look up column 1 in row 1 and note that the encrypted value is three. Three will then be inserted in nibble location L in the register 70.

If the value in the nibble location Q in the main counter is zero, then by looking up the 0 column in row 2 we see that this encrypts to B which is then inserted in to the nibble N location in the register 70. If all the other nibbles in the main counter are zero (ie the count is a binary 0000,0000.0000, 0000,0001) we end up with the last six nibble locations of the register 70 as giving an encrypted value of 3DEB1A.

This completes the first level of encryption. The second level of encryption involves creating pseudo random codes using two different methods, and selectively interacting these with the nibble values stored in the different nibble locations M to R in the main counter 50 and L to M in the first register 70 and creating eight different nibble values which are then inserted in respective nibble locations J to R in a second register 80.

The code stored in the second counter 80 is the code which ultimately will be transmitted by the transmitter.

The first type of pseudo random code PS1 is produced by a code generator 72. In fact the generator 72 generates three separate codes, used respectively for determining the values to be inserted in nibble locations L, P and Q in the second register 80. However since the methods of generating the three codes are generally similar, only the method for generating the code for producing a value for nibble location Q of the second counter 80 will now be described.

The code generator which is shown in FIG. 4 includes an adder 200 which adds a fixed reference value of +5 held in a store 202 to the combined value in nibble locations Q and R of the main counter. A sampler 204 is triggered by the encrypt command unit 68 to sample the sum in the adder 200 and then to encrypt the sampled value using the look-up table 54. Thus if the sampled value were 99 the ninety-ninth code location in the table would be row six column 3 and the read out value would be 5.

This value (in binary form) would be fed to one input of an exclusive OR gate 206. The other input of the exclusive OR gate 206 would receive the value (in binary form) of the contents of nibble location Q in the first counter 70. The exclusive OR gate 206 operates on the two binary codes in sequence. Thus an exclusive OR operation is performed on the least significant bit of each code followed by an exclusive OR operation on the next least significant bit of each code and so on until a new four bit code is generated. The result is the pseudo random code PS1. The second level encryptor 76 includes a sampler 208 which samples this new code PS1 in response to a command from the encryptic command unit 68 and according to its value creates a new value by carrying out the instructions of an instruction table II Unit 210. The instructions in instruction table II (see FIG. 10) require one of three functions to be carried out using one or more of three values namely the value of PS1, the value of PS2 (another pseudo random number whose derivation will be described hereinafter) and the value of one of the nibble locations in the counter 50 or the first register 70. The three functions are, an exclusive OR function, a simple OR function and a RORC (rotate all bits to the right and carry) function. Thus if the value of PS1 is 3 the sampler will be asked to perform an exclusive OR function between the value of PS1 and the value in nibble location L of the first Register. The result of the function is then fed into the nibble location Q in the counter 80.

To fill the nibble location P in the second register 80 a similar code generator 72 is used except that the store 202 contains the value +6. Similarly to fill the nibble location L in the second register 80 the store 202 of the code generator 72 stores the value +7.

Since the maximum count of the two nibble locations Q and R of the counter 50 is 256, the maximum count which could be sampled by the sampler 204 is 256+7=263 and so to ensure sufficient locations for this, the look-up table which is basically a 16×16 table is provided with an overflow row of seven columns.

The second type of pseudo-random code PS2 is produced by a code generator 74. The generator 74 includes a sampler 220 which is triggered by the encrypt command unit 68 to sample the value in nibble location R in counter 50.

The sampler 220 uses the row zero in the look-up table for the column 4 having the sampled value to provide a first row value. Thus if the value in nibble location R was 0001 (i.e. a hexadecimal 1, the value in column 1, row zero, is read out as 7). This first row value is then stored in a store 222. A second sampler 224 again triggered by the encrypt command unit 68 after a slight delay by a delay unit 226, and caused to sample the value in the store 222. This time the sampler uses the value in the store as the column identification for the pointer jump table to provide a second new value. Thus if the value in the store is 7 then as can be seen column 7 of the pointer jump table contains the value 6 and this value is then fed to a cumulative counter 228.

The counter 228 is a cyclical counter with a maximum count of 256. Thus when the count reaches 250 and a count of 9 is added the new count becomes 2.

A count injection unit 230 injects a count of 1 into the counter each time the system is energised so that the counter will always start from 1 but thereafter until de-energised will cycle through zero. Thus the count in the counter 228 will now be 7 (6+1). Upon the next clock pulse from the generator 52, the value in nibble location R of the counter will rise to 0010 i.e. 2. At this point the store 222 will then store the value "B" from column 2 row 0. The sampler 224 then uses the value B as the column designation in the pointer table to obtain a second new value 5 which is injected into the cumulative counter 228. The count in the counter will now read 12 (i.e. 7+5).

The count of the counter 228 thus provides the second pseudo random code PS2. Two further pseudo random codes P1 and P2 are derived from the code PS2 by adding respectively a count of +1 and a count of +2 to the pseudo random code PS2. This is effected by two adders 232 and 234 each having one input connected to detect the count of the counter 228 and each having the other input converted to a respective store 236 and 238 containing respective counts of +1 and +2.

A sampler 240 samples the count of the counter 228, adds to it +5 from a value stored in a store 242 and then uses the resulting value to determine a new value from the look-up table 54. Thus if the value in the counter is 12 this corresponds to the location B in row zero and so the new value is F. This new value has the value of the code PS2. The second level encryptor 76 includes an exclusive OR gate 244 having an input connected to receive the code PS2 while the other input is fed with the value of the nibble in location P of the second counter 80. A sampler 246 samples the output of the exclusive OR gate 244 and according to its value creates a new value by carrying out the instructions of an instructions table III unit 248.

The instructions of the unit 248 (see FIG. 10) require one of three functions to be carried out, namely; an exclusive OR function, an OR function and RORC function using one or more of four values namely PSI, P1, P2 and the value of the nibble in one of the nibble locations Q, P, L and J in the second counter 80.

Thus if the value of PS2 is 12 the function to be carried out would be to exclusive OR the value of PS1 with P2. The resultant value is then entered into location 12 of the counter 80.

To fill the nibble location N in the second register 80, a similar code generator 74 is used but instead of the store 242 storing a +5 it will store a +6. For filling nibble locations M and K the store 230 stores +7 and +8 respectively.

Finally to fill the contents of location J of the second register 80, an exclusive OR gate 260 (see FIG. 11) performs an exclusive OR function on the value of the nibble in location L of the first register 70 and the value of the nibble in the location P in the second register 80.

This now completes the encryption of the count of the counter 50.

The Receiver 100 (see FIG. 12) receives the encrypted code transmitted by the transmitter and stores the code in four locations 102, 104, 106, 108 of a shift register 110. The location 102 stores the 24 bits of the identity code, the location 104 stores the five BITS of the time index code, the location 106 stores the three BITS of the command code and the location 108 stores the 32 BITS of the dynamically encrypted code.

Within the receiver there is an encryption device 112 similar to that of the transmitter and having a clock pulse generator 114 and a main counter 116. The encryption device 112 will encrypt the code of the counter 116 and place the five least significant BITS of the counter 116 into location 124 and the dynamic encrypted code (32 BITS) into the location of 128 of a local register 120. Location 122 of the register 120 stores a 24 BIT identity code which is set in the location at the time of initial setting up of transmitter/receiver pair.

A comparator 132 compares the codes in locations 102 and 122 and generates a signal to an AND gate 140 if equality is detected.

A comparator 134 compares the time index codes in locations 104 and 124 and if equality is detected it generates an output signal to enable another comparator 138 which compares the codes in locations 108 and 128. If equality is detected, the comparator 138 generates an output signal which is fed to the AND gate 140.

If the AND gate 140 receives signals from both comparators 132 and 138 it becomes enabled and feeds the command code in location 106 to a control unit 130 which acts to carry out the command.

The absence of an output signal from the comparator 134 could mean that the clock pulse generators of the transmitter and receiver have got out of synchronisation and so the output from the comparator 134 is fed via an invertor 144 to a difference unit 136 which is caused to sense the polarity of the difference in codes in time index locations 104 and 124.

The output of the difference unit feeds a pulse generator 142 which causes the counter 116 to count up or down accordingly until the comparator detects that equality has been reached.

The pulses generated by the generator 142 are also stored by an auxiliary counter 146. If following equalisation of the time index codes, the comparator 138 then determines the equality of the dynamic codes, the output of the comparator 138 triggers the reset input of counter 146 which is reset to zero. In this way, the count of the counter 116 will have been resynchronised with the main counter in the transmitter. If, however, the auxiliary counter 146 is not reset within a predetermined delay period, the counter 146 automatically counts down to zero and in doing so feeds pulses to the counter 116 to cause the counter 116 to resume its previous value.

Each receiver and transmitter pair have the same identity codes. At the time of manufacture each key is programmed with a unique identity code but each receiver can at any time have its identity code programmed into it or changed. In fact each receiver is provided with four stores for storing four different identity codes so that the receiver can be responsive to any one of four pre-selected keys.

The receiver has connected across its power supply a high value capacitor which ensures that on power disconnection the receiver remains active for at least two hours. Once the receiver becomes de-engaged it loses synch and the stored identity codes. In order to be able to reprogram the receiver, a reprogramming circuit (see FIG. 13) is provided. Four keys 300, 302, 304 and 306 are plugged into respective terminals 310, 312, 314 and 316 of a harness connected to the receiver. The key plugged into the terminal 310 is deemed to be the master key. When activated, the master key transmits first a synch pulse and then its identity code. This is stored in a first store 320. A comparator 324 compares the stored code with a reference code stored in a store 322 to check that the format is correct; for example that the width of this synch pulse exceeds a predetermined duration and that the number of bits in the identity code is correct. If correct, the comparator 324 sends an enable signal to a gate 326 to allow the identity code transmitted by the key 300 and delayed by a delay device 328 to be transmitted to an identity code store 330 through a gate 332. After de-energisation of the receiver and upon a subsequent power up, a reset device 334 sends a reset signal to the ID code store 330 to reset it to zero.

A detector detects the fact that store 330 has been reset to zero and sends an enable signal to the gate 332 to allow the new ID code to pass and be stored in the store 330. Once the new ID code has been stored the gate 332 becomes disabled and no further code can be set into the store 330 until it has been reset again.

Once the ID code of the key 300 has been inserted into the store 330 it can be removed and replaced at will. They key when replaced can then instruct the receiver to store the codes of all the other keys coupled to the harness and then simultaneously resynchronise the clocks of the four keys and the receiver.

To do this the key 300 is plugged into the jack 310 and caused to issue its identity code. The code is stored in a store 340 and a comparator 342 compares the codes in the two stores 330 and 340 and if equality is detected enables three gates 344, 346 and 348 which respectively connect each jack 312, 314 and 316 to a respective supplementary ID code store 350, 352 and 354. Thus by operating each key 302, 304 and 306 in turn to transmit its ID code, the ID codes will be stored in the supplementary ID stores.

The output of the comparator also enables a gate 356 which enables the key 300 when plugged into the jack 300 to transmit a resynch pulse to a resynch command unit 358.

The resynch command unit 358 when activated sends a resynch signal to the keys 302, 304 and 306 and simultaneously to the receiver so that all the keys and the receiver are pulled into synchronisation with each other, counter 146 which is reset to zero. In this way, the count of the counter 116 will have been resynchronised with the main counter in the transmitter. If, however, the auxiliary counter 146 is not reset within a predetermined delay period, the counter 146 automatically counts down to zero and in doing so feeds pulses to the counter 116 to cause the counter 116 to resume its previous value.

Each receiver and transmitter pair have the same identity codes. At the time of manufacture each key is programmed with a unique identity code but each receiver can at any time have its identity code programmed into it or changed. In fact each receiver is provided with four stores for storing four different identity codes so that the receiver can be responsive to any one of four pre-selected keys.

The receiver has connected across its power supply a high value capacitor which ensures that on power disconnection the receiver remains active for at least two hours. Once the receiver becomes de-engaged it loses synch and the stored identity codes. In order to be able to reprogram the receiver, a reprogramming circuit (see FIG. 13) is provided. Four keys 300, 302, 304 and 306 are plugged into respective terminals 310, 312, 314 and 316 of a harness connected to the receiver. The key plugged into the terminal 310 is deemed to be the master key. When activated, the master key transmits first a synch pulse and then its identity code. This is stored in a first store 320. A comparator 324 compares the stored code with a reference code stored in a store 32 to check that the format is correct; for example that the width of this synch pulse exceeds a predetermined duration and that the number of bits in the identity code is correct. If correct, the comparator 324 sends an enable signal to a gate 326 to allow the identity code transmitted by the key 300 and delayed by a delay device 328 to be transmitted to an identity code store 330 through a gate 332. After de-energisation of the receiver and upon a subsequent power up, a reset device 334 sends a reset signal to the ID code store 330 to reset it to zero.

A detector detects the fact that store 330 has been reset to zero and sends an enable signal to the gate 332 to allow the new ID code to pass and be stored in the store 330. Once the new ID code has been stored the gate 332 becomes disabled and no further code can be set into the store 330 until it has been reset.

Once the ID code of the key 300 has been inserted into the store 330 it can be removed and replaced at will. They key when replaced can then instruct the receiver to store the codes of all the other keys coupled to the harness and then simultaneously resynchronise the clocks of the four keys and the receiver.

To do this the key 300 is plugged into the jack 310 and caused to issue its identity code. The code is stored in a store 340 and a comparator 342 compares the codes in the two stores 330 and 340 and if equality is detected enables three gates 364, 366 and 368 which respectively connect each jack 312, 314 and 316 to a respective supplementary ID code store 350, 352 and 354. Thus by operating each key 302, 304 and 306 in turn to transmit its ID code, the ID codes will be stored in the supplementary ID stores.

The output of the comparator also enables a gate 356 which enables the key 300 when plugged into the jack 300 to transmit a resynch pulse to a resynch command unit 358.

The resynch command unit 358 when activated sends a resynch signal to the keys 302, 304 and 306 and simultaneously to the receiver so that all the keys and the receiver are pulled into synchronisation with each other.

I claim:

1. A security system for generating a pseudo random code comprising a clock pulse generator for generating pulses at regular intervals, a counter for counting the clock pulses generated, and an encryption device for encrypting the count of the counter, the counter being divided into a first plurality of locations each containing a predetermined number of nibbles, and the encryption device having a first register divided into a second plurality of locations and a second register divided into a third plurality of locations with each location of said first and second registers having said predetermined number of nibbles, a look-up table for converting the contents of at least one location selected from said first, second and third plurality of locations from one value to another, means for sampling at least selected ones of the locations of the counter and converting the contents therein using the look-up table according to a first predetermined formula and inserting the converted values into selected locations in the first register, and means for combining the contents of selected locations in the counter and first register in accordance with a second predetermined formula and inserting the results into pre-selected locations in the second register.

2. A system according to claim 1 including first code generating means for generating a first code from the contents of one of the selected locations in the first counter by combining those contents with the contents of one of the selected locations in the first register using an Exclusive OR gate.

3. A system according to claim 2 wherein said first code produced at the output of the Exclusive OR gate is processed in accordance with instructions of a first predetermined instruction table and the results are inserted in a selected location in the second register.

4. A system according to claims 1, 2, or 3 including second code generating means for generating a second code by encrypting the contents of a selected location of the counter using the look-up table to produce a first value, encryption means for encrypting the first value using the look-up table to produce a second value, a cyclic counter to cumulatively sum the second values following each increment in the count of the cyclical counter and using the look-up table to produce said second code from the count of the cyclical counter.

5. A system according to claim 4 comprising an Exclusive OR gate for combining the second code with the contents of a selected location of the second Register and processing the result in accordance with instructions of a second predetermined instruction table and inserting the processed result into a selected location in the second register.

6. A system according to claim 1 comprising an Exclusive OR gate for combining the contents of a selected location in the first register with the contents of a selected location of the second register and inserting the result in another selected location in the second register.

* * * * *

UNITED STATES PATENT AND TRADEMARK OFFICE
CERTIFICATE OF CORRECTION

PATENT NO. : 5,760,700
DATED : June 2, 1998
INVENTOR(S) : Antony Mark Ellis

It is certified that error appears in the above-indentified patent and that said Letters Patent is hereby corrected as shown below:

TITLE PAGE:
Item 56, References Cited, U.S. Patent Documents, add the following cited references:

-- 5,142,577   8/1992   Pastor..........380/23
   5,237,610   8/1993   Gammie.......380/23
   5,644,354   7/1997   Thompson....380/20 --.

Column 1, line 9, after "now abandoned" and before "The present invention" insert -- BACKGROUND OF THE INVENTION --.
Column 3, line 51, replace "actives" with -- activates --.
Column 5, line 22, replace "from" with -- form --.
Column 10, line 4, replace "de-engaged" with -- disengaged --.
Column 10, line 30, replace "they key" with -- the key --.
Column 10, line 51,through Column 11, line 50, delete all text beginning with "counter 146" and ending with "are pulled into synchronisation with each other".

Signed and Sealed this

Thirteenth Day of April, 1999

Attest:

Attesting Officer

Q. TODD DICKINSON

Acting Commissioner of Patents and Trademarks